United States Patent Office 3,550,416
Patented Dec. 29, 1970

3,550,416
FIELD CONCENTRATOR DEVICE FOR FORMING OF METALLIC WORKPIECES
Horst Schenk, Erlangen, and Erhard Prölss, Katzwang, Germany, assignors to Siemens Aktiengesellschaft, Munich, Germany, a corporation of Germany
Filed Jan. 21, 1969, Ser. No. 792,380
Claims priority, application Germany, Jan. 23, 1968, 1,652,638
Int. Cl. B21d 26/14
U.S. Cl. 72—56                                3 Claims

ABSTRACT OF THE DISCLOSURE

A field concentrator device for forming metallic workpieces has a longitudinal axis and has a plurality of annular frusto-conical parts which are stacked coaxial with the longitudinal axis and have mutually contacting conical surfaces. The parts have electrically insulating surfaces and have the same outer diameter. The plurality of parts has an inner composite wall surface defining a cavity having side and bottom walls corresponding to the side and bottom walls of the workpiece. At least two of the parts are disposed in the region where the side and bottom walls of the cavity join.

---

Our invention relates to the direct-forming of metallic workpieces with the aid of pulsed magnetic fields. More specifically, our invention relates to field concentrators for concentrating pulse-type magnetic fields produced by a working coil which subject a pot-shaped metallic workpiece to simultaneous radial and axial forming pressures.

The work coils employed for magnetic-pulse forming of metals are of the compression type or flat (pancake) type. Compression coils are used for narrowing tubular workpieces and flat coils for deep-drawing planar workpieces. Field concentrators increase the forming pressure and apply the pressure to specific regions of the workpiece. A pot-shaped workpiece can be compressed at its cylindrical portion and be deep-drawn at its bottom portion. Until now, however, it was necessary to stretch the workpiece following the first formation. In addition, the work coil had to be exchanged and the workpiece newly prepared thereby precluding the forming pressure from acting simultaneously at the region where the cylindrical and the planar portions of the workpiece join.

Accordingly, it is an object of the invention to provide a field concentrator for radially and axially forming a pot-shaped metallic workpiece in one work step. More specifically, it is an object of the invention to simultaneously compress and deep-draw the workpiece.

According to the invention, we provide a field concentrator which has a longitudinal axis and is constructed of annular frusto-conical parts. The parts have the same outer diameter and are provided with electrically insulating surfaces. The parts are stacked coaxial with respect to the longitudinal axis and have mutually contacting conical surfaces. The stacked parts have an inner composite wall surface which defines a cavity having side and bottom walls corresponding to the side and bottom walls of the workpiece. At least two annular frusto-conical parts are arranged where the side and bottom walls join. The annular frusto-conical parts of the field concentrator can consist, for example, of an alloy of copper-beryllium, a material known for its use in fabricat-field concentrators.

The foregoing and more specific objects and features of the invention will be apparent from the following description of a device for simultaneously producing radial and axial pressures for compressing and deep-drawing metallic workpieces according to the invention taken in conjunction with the accompanying drawing.

Figure 1:
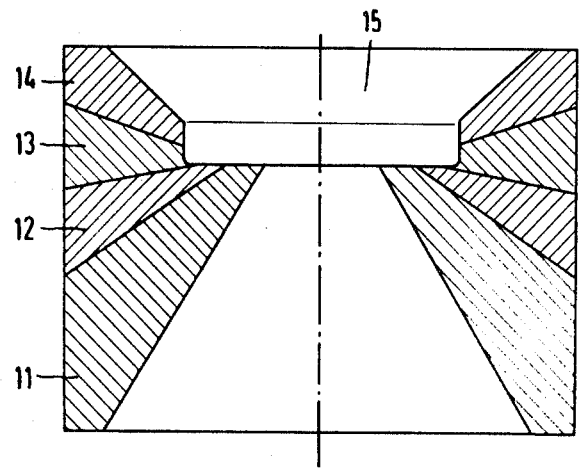
Figure 2:
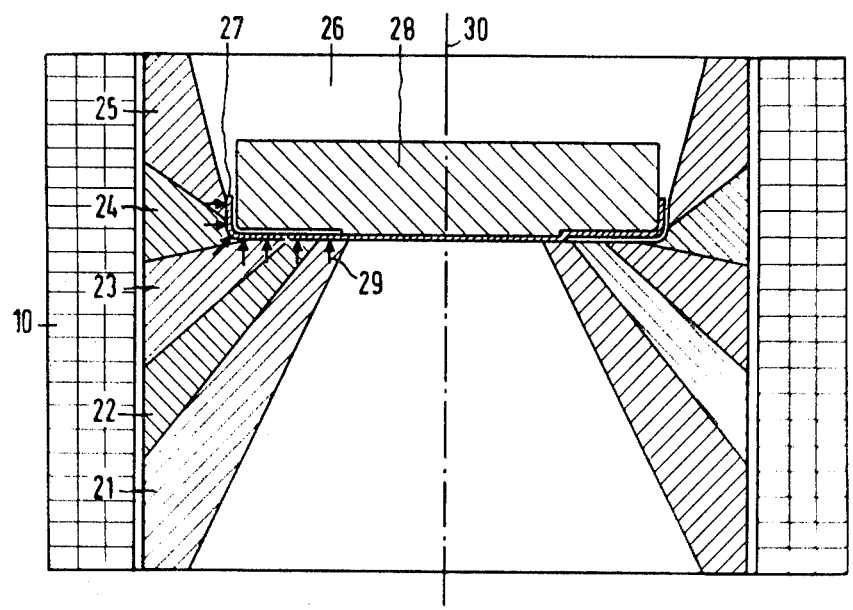

In the drawing,
FIG. 1 is a schematic illustration in section of a field concentrator according to the invention; and
FIG. 2 illustrates diagrammatically and in section a work coil with a field concentrator according to the invention in conjunction with a representation of a workpiece forming process.

FIG. 1 illustrates a field concentrator comprising four annular frusto-conical parts indicated by reference numerals 11 to 14. The parts are shown mutually interrelated in axial symmetry so that their respective inside wall surfaces together form a composite inner wall surface defining the cavity 15. The contour of cavity 15 corresponds to the outside geometrical form of the workpiece to be formed.

According to a feature of the invention, the annular parts are stacked so that they are inwardly directed toward each other in azimuthal direction. This configuration ensures that a uniform flux distribution is obtained between the workpiece to be formed and the field concentrator while at the same time influencing the forming pressure through the openings of the annular parts to only a negligible degree.

The forming of workpieces with pulse-shaped magnetic fields produced by work coils utilizes the phenomenon that time dependent changes in a magnetic field cause pressure to be exerted upon a metal surface. Through the discharge of a high-voltage capacitor, an axially aligned, pulse-shaped magnetic field is developed in a work coil containing a metallic workpiece in its interior. The magnetic field develops an azimuthal eddy current in the workpiece. Because of skin effect, the eddy current is limited to the outer skin portion of the workpiece provided that the frequency of the oscillating circuit comprising the work coil and the capacitor and the electrical conductivity of the workpiece are both sufficiently high. The inner portion of the workpiece is then virtually free of the field so that the pulse-shaped magnetic field is concentrated in the gap between the coil and the workpiece.

FIG. 2 illustrates schematically how a field concentrator according to the invention is employed to simultaneously compress and deep-draw a metallic workpiece. The field concentrator has a longitudinal axis and comprises five annular frusto-conical parts 21–25. The inner wall surfaces of the parts 21–25 define a cavity 26 wherein are disposed a metal cover 27 and a die 28. The die 28 lies in the metal cover 27. The surface of die 28 contacting the metal cover 27 is contoured so that the cover 27 is deep-drawn along a ring area having a width of about 25 mm. and bordering along the edge of the cover, while at the same time the cover is also compressed along its side wall which has a height of about 8 mm. The field concentrator lies within the interior of work coil 10. To the left of longitudinal axis 30, the workpiece is shown prior to the application of forming pressure whereas to the right of the longitudinal axis, the workpiece is shown after having been subjected to forming pressure.

The field concentrator directs the magnetic flux to flow in the thin insulation gap between the workpiece and the field concentrator. In addition, the induced eddy currents have the effect that the magnetic field can occur only down to the depth of penetration in the workpiece and in the field concentrator. The magnetic flux enters from below through the large central bore of the field concentrator and is radially deflected through the bottom of the cover 27 in an outward direction and passes perpendicularly upward at the cylindrical cover rim. The eddy currents induced in the cover travel in a circular direction in the cover bottom and in an azimuthal direction in the cover rim. The magnetic induction and the eddy current density together develop a force which acts at the bottom of the cover in an upward direction perpendicular to the latter and at the rim of the cover in a radially inward direction, as well as at the region where the rim and bottom of the cover join in a diagonally upward direction. The force directions are depicted by arrows 29.

A principal advantage of the field concentrator according to the invention is that a radial and axial tolerance balance is simultaneously established by forming a pot-shaped workpiece. This is required, for example, during the assembly of electric motors by means of pulse-shaped magnetic fields. Thus, for example, by the simultaneous compression and deep-drawing of a pot-shaped bearing shield, axial and radial tolerances can be bridged and, in addition, the bearing shield can be connected with other motor parts.

To those skilled in the art it will be obvious upon a study of this disclosure that our invention permits of various modifications with respect to structural features and hence that the invention may be given embodiments other than particularly illustrated and described herein, without departing from the essential features of the invention and within the scope of the claims annexed hereto.

We claim:

1. In a magnetic pulse former having a field concentrator ofr concentrating magnetic energy and pressure on the bottom and side walls of pot-shaped metal workpieces, said field concentrator having a longitudinal axis and comprising a plurality of annular frusto-conical parts with mutually contacting conical surfaces coaxial with said axis, said parts having electrically insulating surfaces and having the same outer diameter, said plurality of parts having an inner composite wall surface defining a cavity, said cavity having side and bottom walls corresponding to the side and bottom walls of the workpiece, at least two of said parts being disposed in the region where said side wall of said cavity joins said bottom wall of said cavity.

2. In a magnetic pulse former according to claim 1, said concentrator comprising a die being disposed in said cavity and having a surface corresponding to the geometric shape of a workpiece to be formed, said surface of said die being contactable with one of the surfaces of the workpiece, and said side and bottom walls of said cavity being contactable with the other surface of the workpiece.

3. A magnetic pulse former for producing pressure for forming metal workpieces by pulsed magnetic fields, comprising a compression coil adapted to be electrically connected to a current pulse supply source, a field concentrator received within the interior of said coil, said field concentrator having a longitudinal axis and comprising a plurality of annular frusto-conical parts, said parts being stacked coaxial with said axis and having mutually contacting conical surfaces, said parts having electrically insulating surfaces, said plurality of parts having an outer cylindrical composite wall surface directed toward the inner side of said coil and having an inner composite wall surface definnig a centrally located cavity, said cavity having side and bottom walls corresponding to the side and bottom walls of the workpiece, said bottom wall of said cavity having a circular opening, at least two of said parts being disposed in the region where said side wall of said cavity joins said bottom wall of said cavity, and a die being disposed in said cavity and having a surface corresponding to the geometric shape of a workpiece to be formed, said surface of said die being contactable with one of the surfaces of the workpiece, and said side and bottom walls of said cavity being contactable with the other surface of the workpiece.

References Cited
UNITED STATES PATENTS

| | | | |
|---|---|---|---|
| 3,365,923 | 1/1968 | Schenk | 72—56 |
| 3,412,590 | 11/1968 | Lippmann et al. | 72—56 |
| 3,442,013 | 5/1969 | Schenk et al. | 29—421 |

RICHARD J. HERBST, Primary Examiner

U.S. Cl. X.R.

29—421